Oct. 6, 1931.  B. J. HALL  1,825,728
APPARATUS FOR DEVELOPING PHOTOGRAPHIC PRINTS AND THE LIKE
Filed Aug. 20, 1928    9 Sheets-Sheet 4

INVENTOR:
B. J. Hall

Oct. 6, 1931.  B. J. HALL  1,825,728
APPARATUS FOR DEVELOPING PHOTOGRAPHIC PRINTS AND THE LIKE
Filed Aug. 20, 1928  9 Sheets-Sheet 5

INVENTOR:
B. J. Hall
by Monroe E. Miller
Atty.

Oct. 6, 1931. B. J. HALL 1,825,728
APPARATUS FOR DEVELOPING PHOTOGRAPHIC PRINTS AND THE LIKE
Filed Aug. 20, 1928 9 Sheets-Sheet 6

INVENTOR:
B. J. Hall

Oct. 6, 1931.  B. J. HALL  1,825,728
APPARATUS FOR DEVELOPING PHOTOGRAPHIC PRINTS AND THE LIKE
Filed Aug. 20, 1928  9 Sheets-Sheet 9
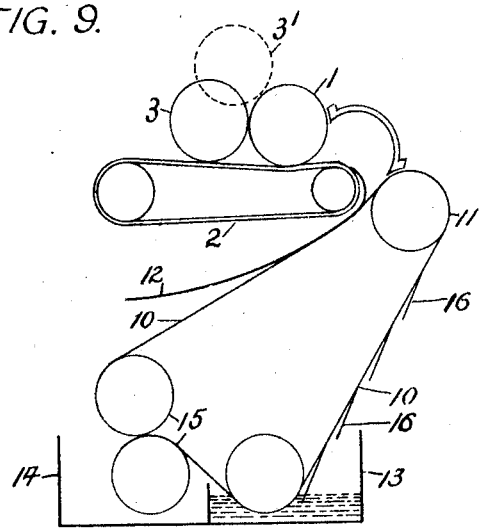
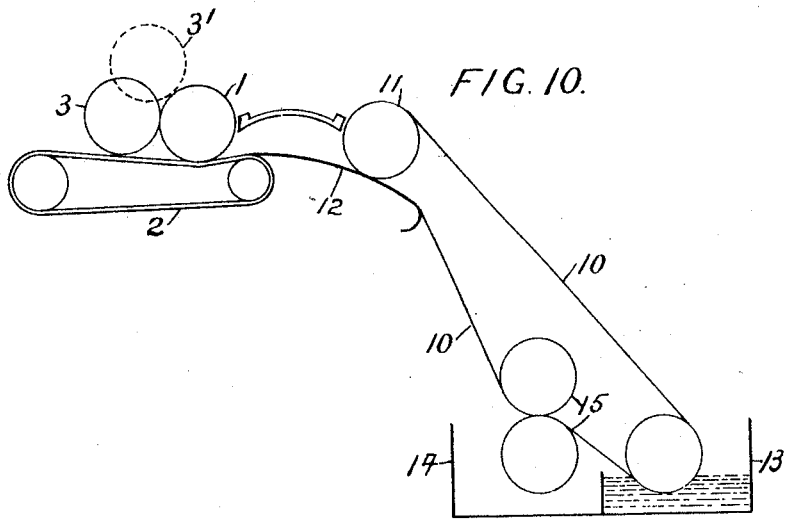

Patented Oct. 6, 1931

1,825,728

UNITED STATES PATENT OFFICE

BENJAMIN JAMES HALL, OF LONDON, ENGLAND, ASSIGNOR TO B. J. HALL & COMPANY, LTD., OF LONDON, ENGLAND

APPARATUS FOR DEVELOPING PHOTOGRAPHIC PRINTS AND THE LIKE

Application filed August 20, 1928, Serial No. 300,845, and in Great Britain November 24, 1927.

This invention has reference to apparatus for developing photographic prints and the like, and has for its object to produce a machine which will develop the whole surface of the print by a rubbing action and issue the print in a finished condition.

According to this invention, in one construction of this machine, I may employ two adjustable gripping rollers geared together for gripping the paper as it is fed into the machine. Arranged in advance of these gripping rollers are two developing or rubbing rollers, geared together and revolving in contrary directions, the one in advance is in fixed bearings and the rear one, although it may be mounted in fixed bearings also, is preferably linked to be lowered or raised concentrically with the other, which movement may be controlled by a suitable pawl or a time regulating device in the form of a dashpot. The developing rollers, to which is applied the necessary chemical with which the paper is treated as it passes through the machine, bear upon an endless band passing around the lower gripping roller and around a roller mounted in front of said developing rollers, along which band the paper travels as it passes through the machine. The peripheral velocity of the developing rollers is greater than the motion of the endless band.

In another construction of machine I employ two adjustable gripping rollers geared together, and arrange in advance of these gripping rollers one developing roller, suitably geared, bearing upon an endless band passing around the lower gripping roller, and around a roller mounted in front of said developing roller, the peripheral velocity of this gripping roller being greater than the motion of said endless band.

Arranged in front of the developing roller is what I term a damper or flat developer made or covered with a material capable of absorbing the necessary chemical with which the paper is treated. This damper is mounted so as to enable it to be raised and lowered either by hand or automatically and when in operation bears upon the endless band.

In both these constructions of the machine I may dispense with the gripping rollers and feed the print directly under the developing roller mounted in fixed bearings.

In order to completely neutralize the action of any chemical remaining on the surface of the paper, I may employ a pad, roller or endless band saturated with clean water and so arranged that it will automatically wipe over the surface of the developed print. In such an arrangement I may also provide a method or methods whereby the soiled water is discharged from the pad, roller or endless band and replaced by clean water. Further to ensure a plentiful supply of clean water in cases where the endless band will not carry sufficient by reason of its tension or otherwise, I attach to said band suitable water carriers which may consist of an absorbent material, one side of which is attached to the band and the other free.

In order that the invention may be clearly understood, I have appended the accompanying drawings.

Figs. 9 and 10 show diagrammatically two methods for neutralizing the action of any chemical remaining on the print as it issues from the fixed developer.

Figure 1:
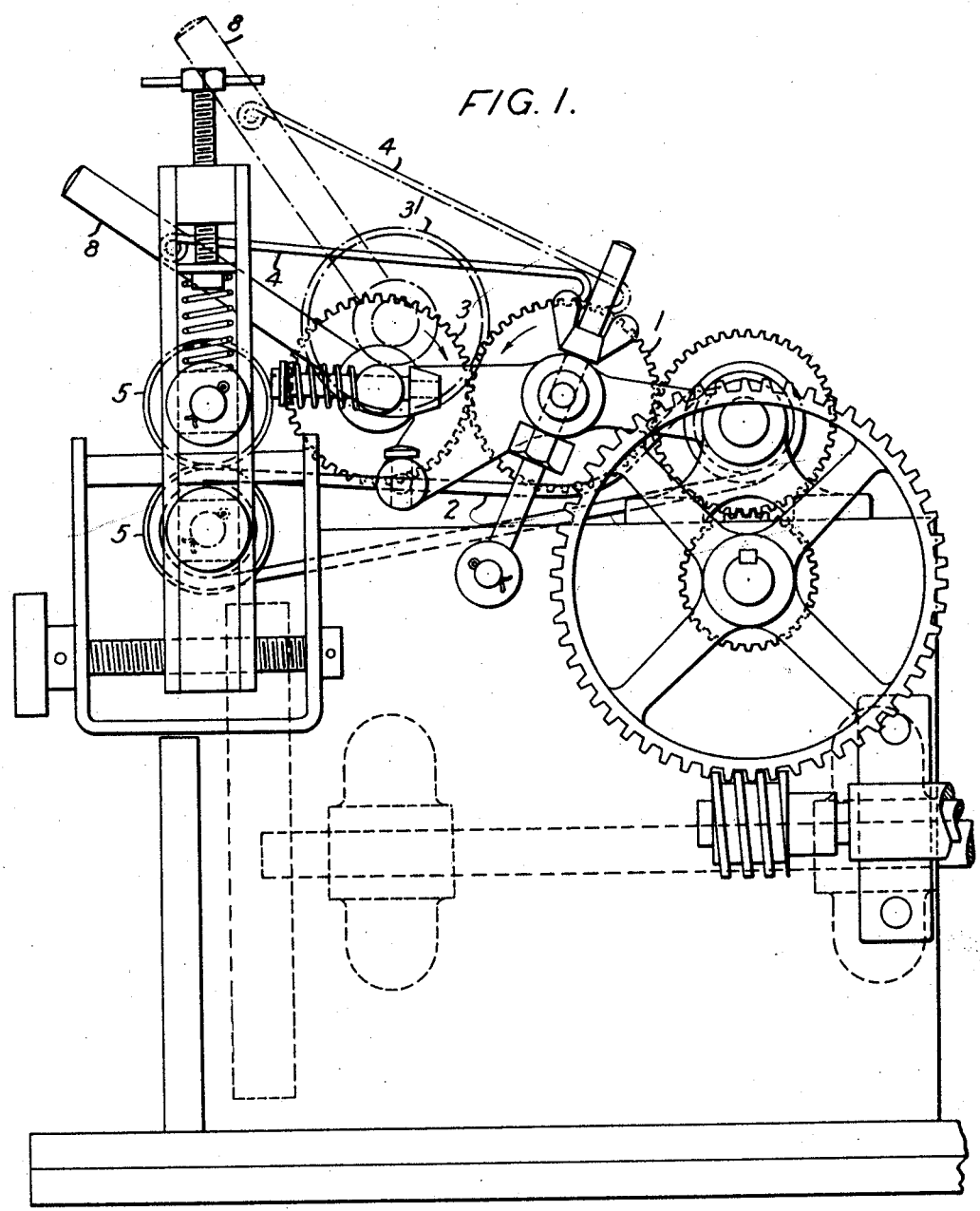
Fig. 1 is a side elevation showing the machine with two adjustable gripping rollers and an automatically operated pawl for controlling the movable developing roller.

Referring to Fig. 1, 1 represents the fixed rubbing or developing roller which revolves in the same direction as the continuous band 2, but at a slightly greater speed. Geared to the roller 1 is the movable rubbing or developing roller 3, which revolves in the opposite direction to roller 1. This roller 3 is shown in dotted lines in its raised position at 3', being gradually lowered from this position when the print is being fed into the machine by the pawl 4 which engages with the teeth of the gear wheel on the roller 1. The print to be developed is fed into the machine between the adjustable gripping rollers 5.

The modus operandi is as follows:—

When the machine is started, the roller 3 is in the position shown in dotted lines at 3'. The print is fed between the gripping rollers 5, passing under roller 1, and as roller 1 revolves, roller 3 is gradually lowered by the action of pawl 4 onto the paper, the pawl subsequently slips from notch to notch of the gear wheel on roller 1 and remains out of action so far as concerns the control of roller 3 until the print has passed through the machine. Now as the grip on the print between roller 1 and the band 2 is greater than the grip between roller 3 and said band 2, the print is caused to travel forward at the speed of such band 2 and is consequently rubbed in a contrary sense by both rollers, whereby the chemical carried by both rollers develops the print. It will thus be seen at the commencement that development is completed by roller 1 and at the finish that development is completed by roller 3, consequently the whole sheet is most effectively covered with the developing solution.

When the print has passed through the machine, roller 3 is again raised into position 3' by lever 8, and this action stops the machine ready for the insertion of the next print.

Figure 2:
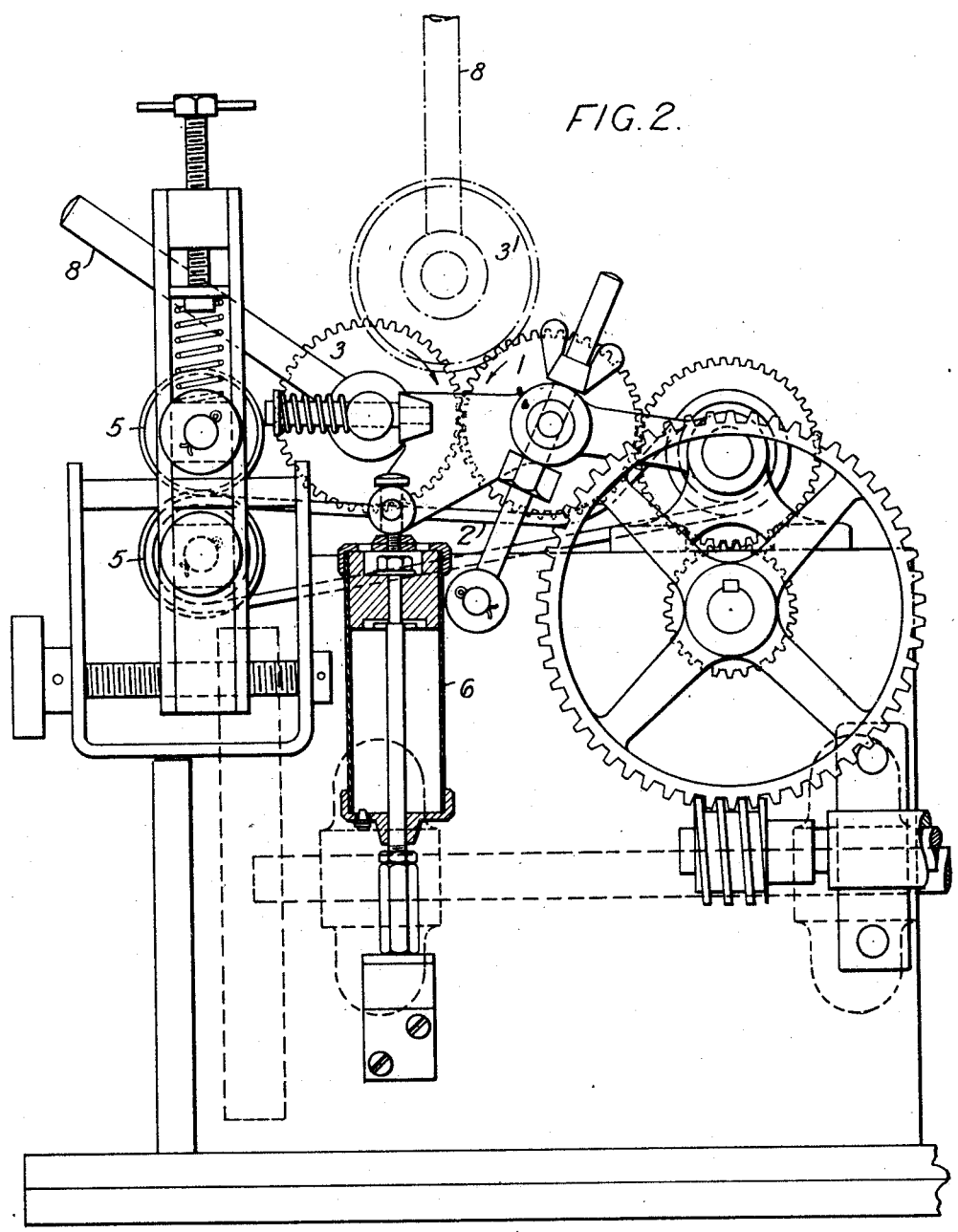
Fig. 2 is a similar view to Fig. 1 showing the movable roller controlled by a dashpot.

The machine shown by Fig. 2 is similar in operation to that shown by Fig. 1, with the exception that the roller 3 is controlled by the action of dashpot 6, which dashpot is so timed that when the machine is started a sufficient interval will elapse before said roller 3 returns to its operative position thus admitting the passage of the print to be developed.

Figure 3:
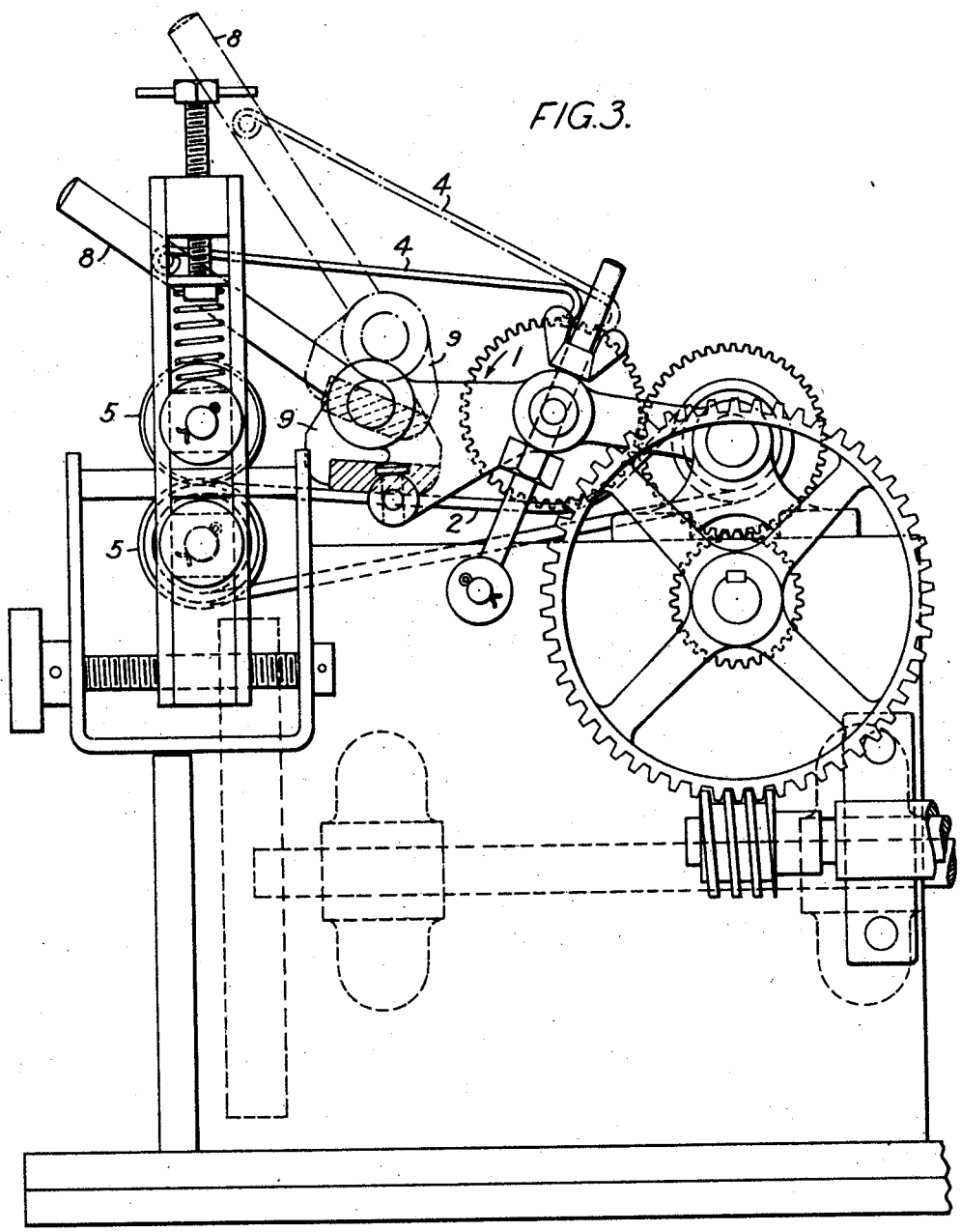
Fig. 3 is a side elevation showing the machine with a flat movable developer or damper, in place of the movable roller, controlled by a pawl.

At Fig. 3 I have shown a machine similar in all respects to Fig. 1, with the exception that in place of a movable rubbing roller 3, I employ what I term a damper 9. This damper 9 which bears upon the endless band 2 has a rubbing action on the print, as it passes through the machine similarly to the action of the roller 3 and is held in its raised position by the pawl 4.

Figure 4:
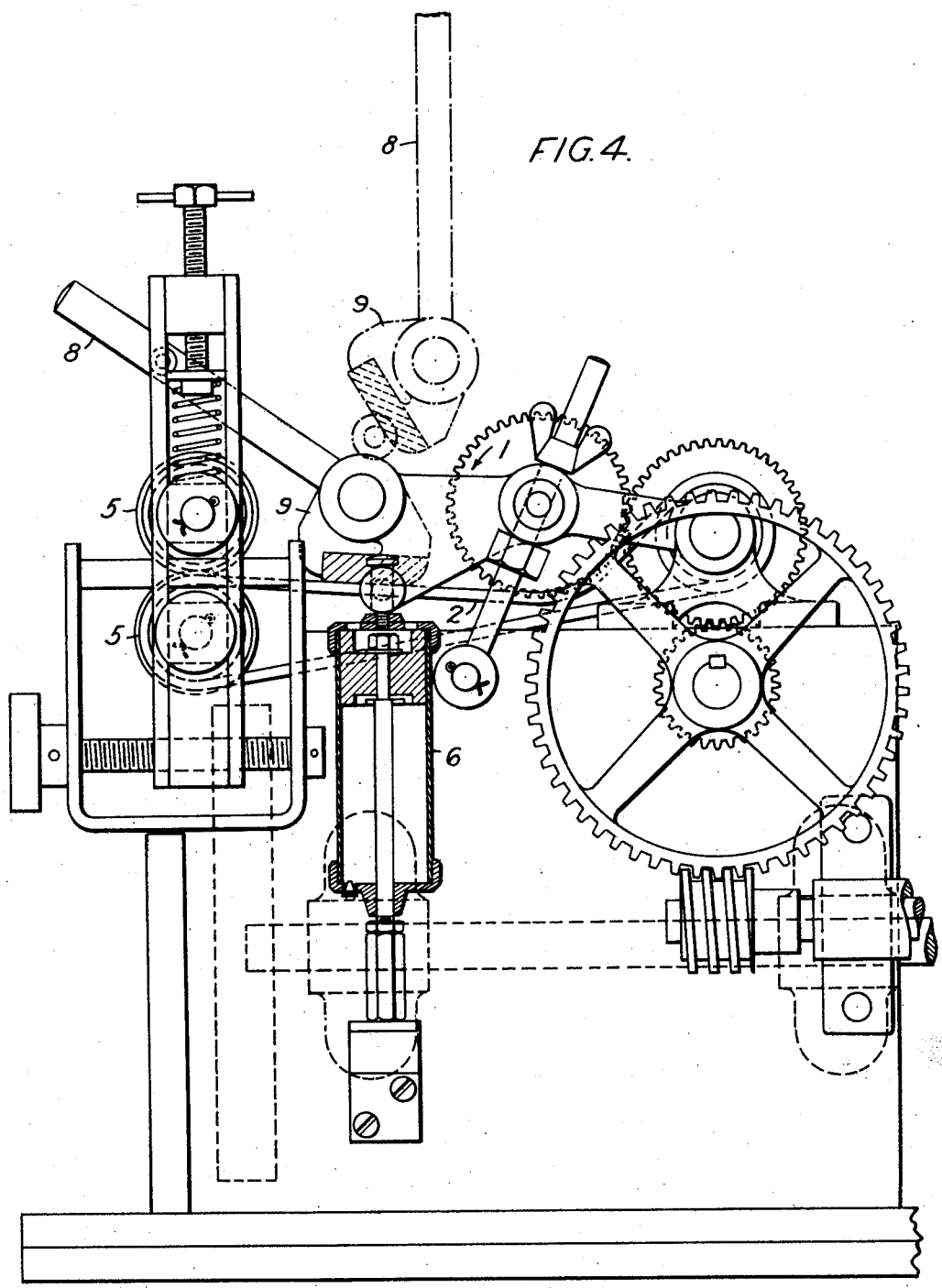
Fig. 4 is a similar view to Fig. 2 showing the movable developer controlled by a dashpot.

The machine illustrated by Fig. 4 shows the damper 9 controlled by the dashpot 6, which is timed to permit said damper 9 to return to its operative position as soon as the print has passed under roller 1.

Figure 5:
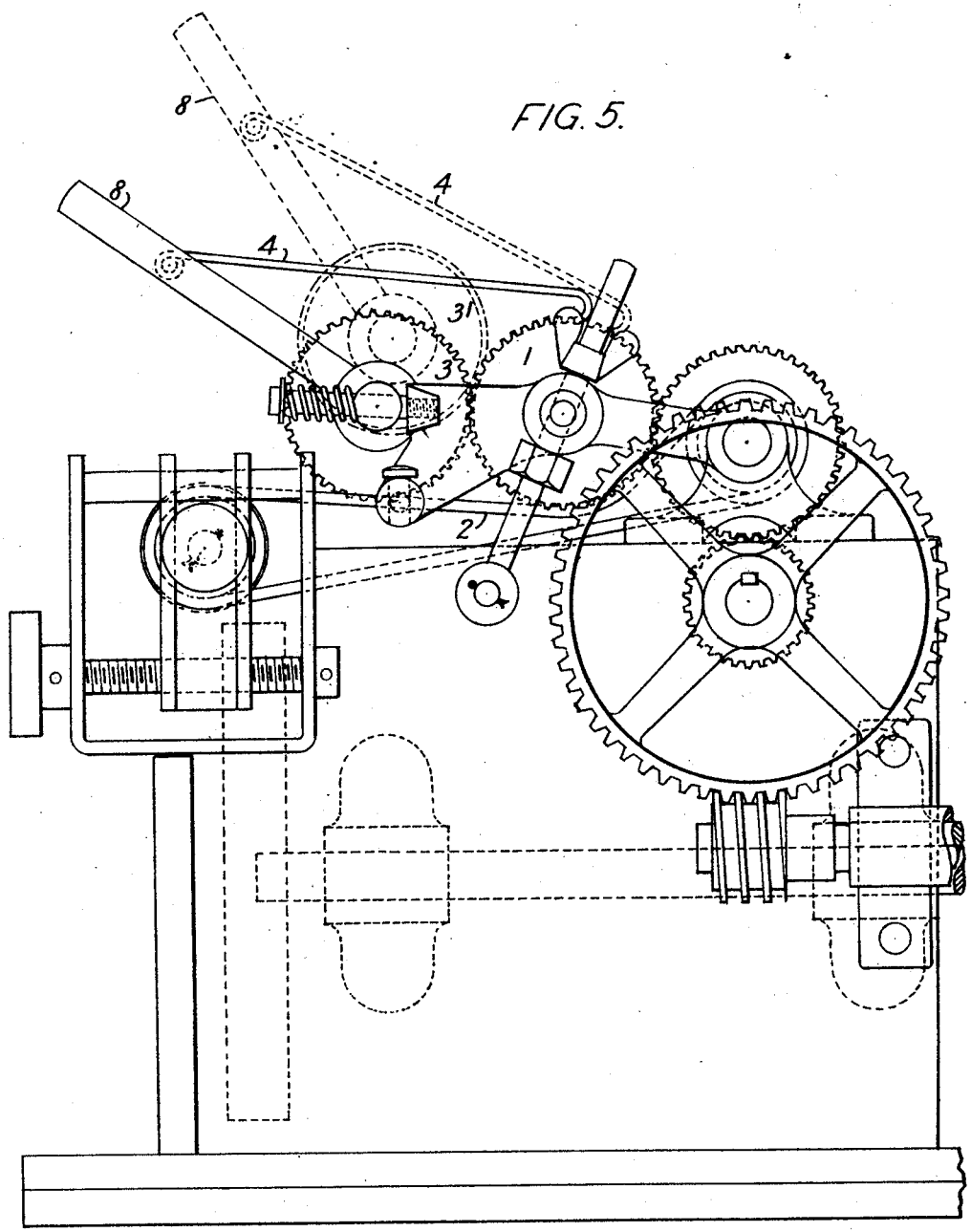
Fig. 5 is a side elevation of a simplified form of the machine showing the movable developing roller controlled by a pawl.

At Fig. 5 I have shown a simplified form of the machine in which I dispense with gripping rollers 5 and feed the print directly under the developing or rubbing roller 1, the movable rubbing or developing roller 3 being controlled in its inoperative position by the pawl 4. The operation of this machine is similar to those in which gripping rollers are employed.

Figure 6:
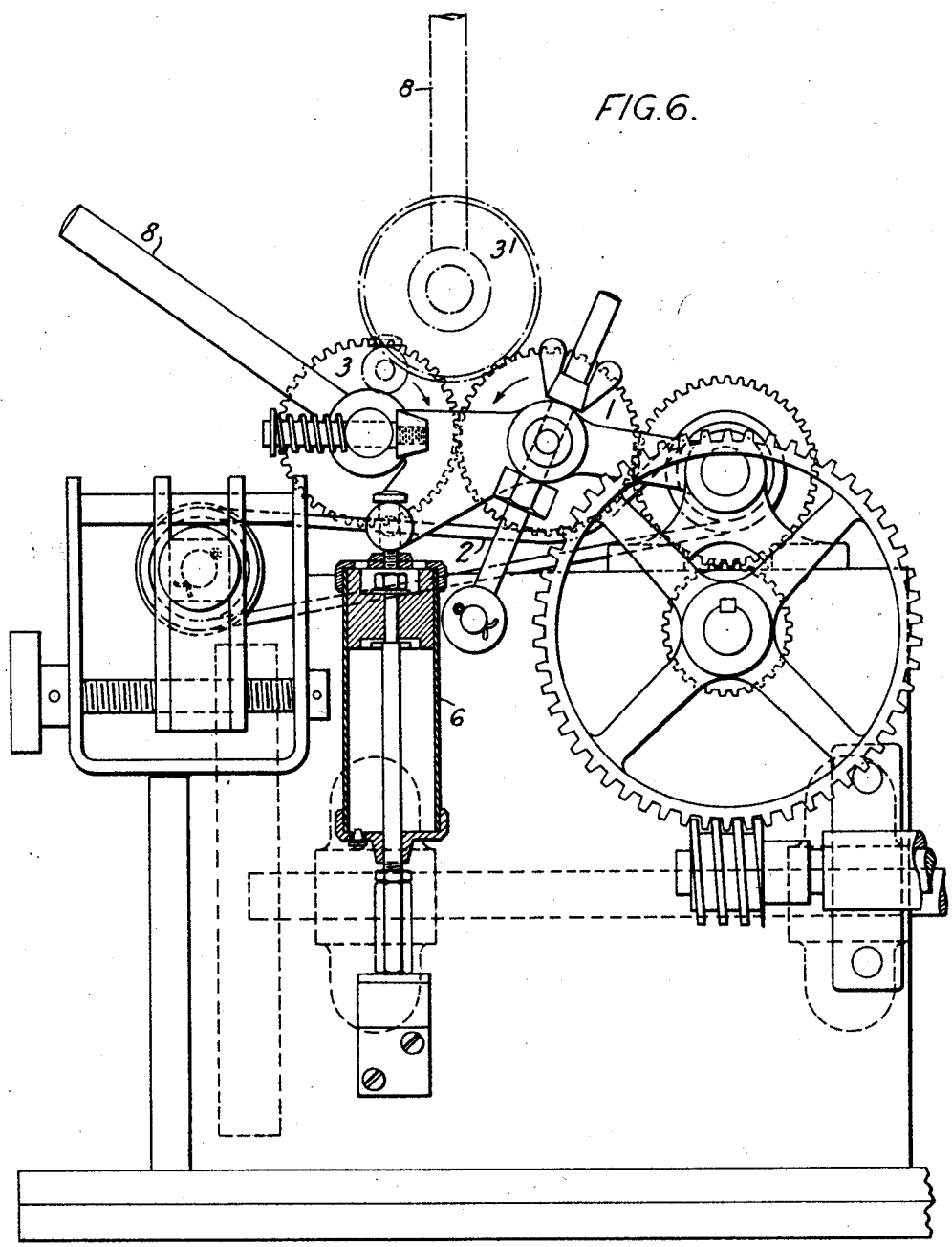
Fig. 6 is a similar view to Fig. 5 showing the movable developing roller controlled by a dashpot.

Fig. 6 also shows a machine in which the gripping rollers 5 are dispensed with, but in this case, the movable developing roller 3 is controlled by the dashpot 6.

Figure 7:
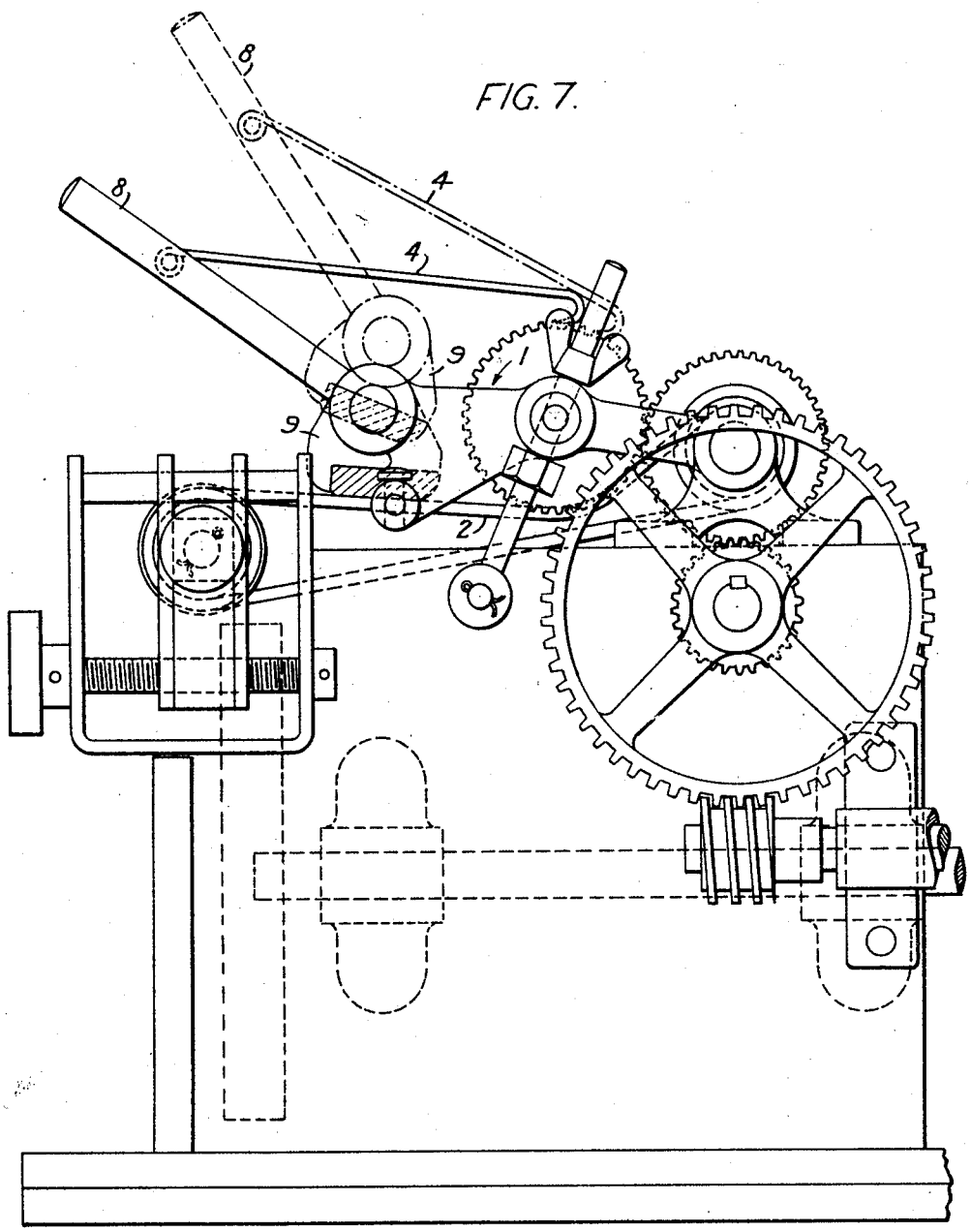
Fig. 7 is a side elevation of a simplified form of the machine showing a flat movable developer or damper, in place of the movable developing roller, controlled by an automatically operated pawl.

At Fig. 7 I have shown a machine in which the gripping rollers are dispensed with, and in place of the movable rubbing or developing roller 3, I employ a damper 9 and this damper 9 is held in its inoperative or raised position by the pawl 4. The operation of this machine is similar in action to the machine shown by Fig. 5.

Figure 8:
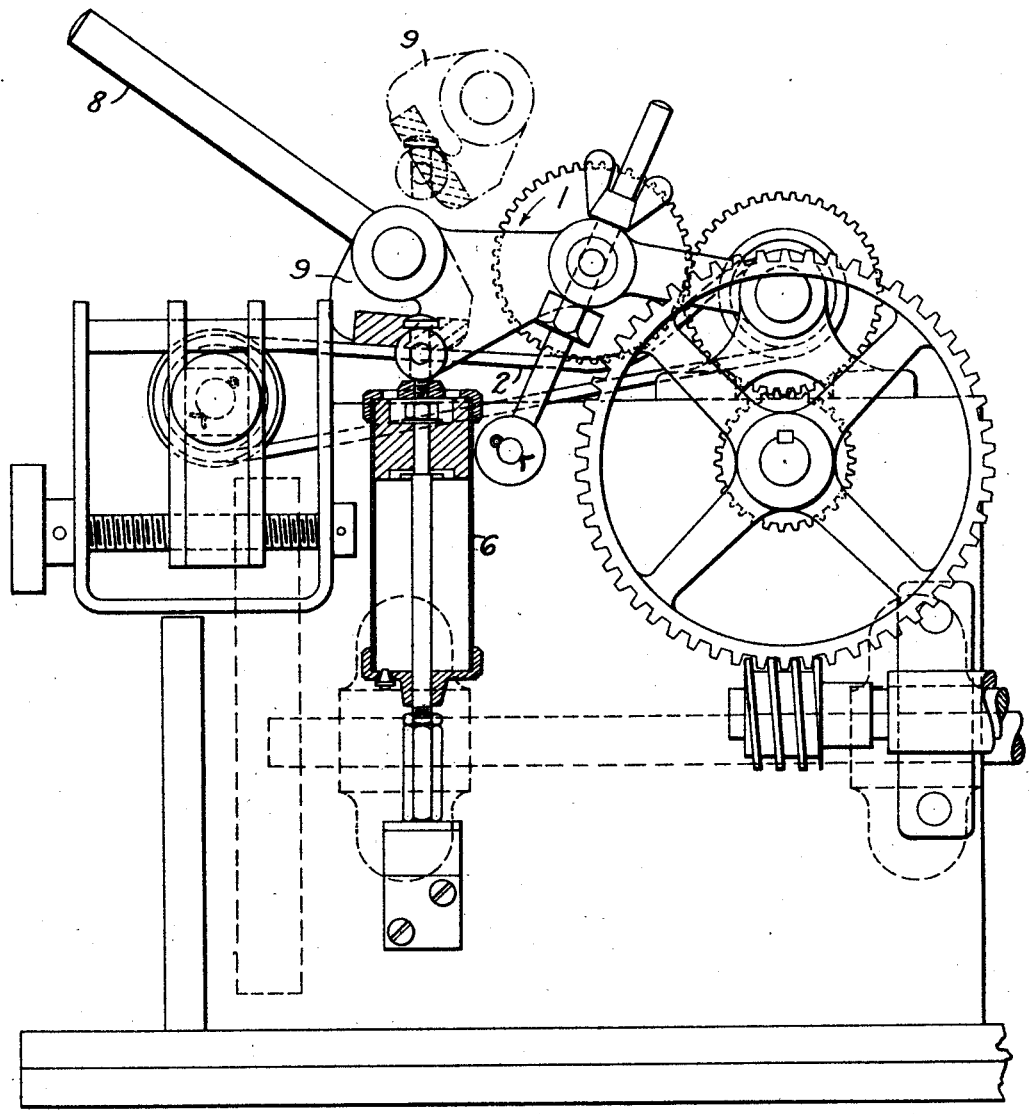
Fig. 8 is a similar view to Fig. 7, showing the flat movable developer or damper controlled by a dashpot.

The machine illustrated by Fig. 8 is identical with the machine shown by Fig. 7, excepting that the damper 9 is maintained in its raised or inoperative position by the dashpot 6.

At Figs. 9 and 10, I have shown diagrammatically two examples of the endless band arrangement consisting of an endless band 10 arranged on roller 11, and so disposed that the prints on leaving roller 1, and passing along continuous band 2 will be gripped between band 10, which is travelling slightly faster than the print, and by preference between a suitable interceptor 12, which forms a rubbing plate, the object of which is to prevent band 2 being wetted by water. The band 10 takes up clean water from tank 13, and distributes it over the surface of the print by contact with this interceptor 12. The chemical with which said band 10 has now become charged is discharged into tank 14 by means of the squeegee rollers 15.

In order to ensure that the band 10 carries a sufficient supply of clean water I may provide said band with suitable water carriers which may consist of an absorbent material 16 suspended from said band as shown by Fig. 9.

What I claim as my invention and desire to secure by Letters Patent is:—

1. An apparatus of the character described comprising means for moving a sensitized sheet, two developer applying members arranged to contact in succession with the sensitized surface of the sheet, both of said members having a rubbing action on the sheet, the first member being mounted for movement to and from said means, and means for delaying the movement of said first member toward the first named means.

2. An apparatus of the character described comprising means for moving a sensitized sheet, two developer applying members arranged to contact in succession with the sensitized surface of said sheet, the second member having a motion forwardly with reference to said means faster than the sheet, the first member being mounted for movement to and from said means, and means for delaying the movement of said first member toward the first named means.

3. An apparatus of the character described comprising an endless band mounted for circuitous movement and adapted to move a sensitized sheet, two developer applying members arranged to contact in succession with the sensitized surface of a sheet moving with said band, both of said members having a rubbing action on the sheet, the first member being mounted for movement to and from said band, and means for delaying the movement of said first member toward the band.

4. An apparatus of the character described comprising an endless band mounted for circuitous movement and adapted to move a sensitized sheet, two developer applying members arranged to contact in succession with the sensitized surface of a sheet moving with said band, both of said members having a rubbing action on the sheet, the first member being mounted for movement to and from said band, and means for delaying the movement of said first member toward the band, the second member being movable forwardly faster than the band.

5. An apparatus of the character described comprising means for moving a sensitized sheet, a movable developer member arranged to contact with the sensitized surface of a sheet moving with said means, another developer member mounted for movement into and out of a position to contact with said sensitized surface, and means for delaying the movement of the secondnamed member toward the firstnamed means controlled by the movement of the firstnamed member.

6. An apparatus of the character described comprising means for moving a sensitized sheet, a rotary developer member arranged to contact with the sensitized surface of a sheet moving with said means, another developer member mounted for movement to and from a position to contact with said sensitized surface, and means for delaying the movement of the secondnamed member toward the firstnamed means controlled by the rotary movement of the first named member.

7. An apparatus of the character described comprising means for moving a sensitized sheet, a rotary developer member arranged to contact with the sensitized surface of a sheet moving with said means, another developer member mounted for movement to and from a position to contact with said sensitized surface, and means for delaying the movement of the secondnamed member toward the firstnamed means including a pawl movable with the secondnamed member and a gear wheel rotatable with the firstnamed member and arranged for the engagement of said pawl to hold the second named member away from the firstnamed means until said gear wheel is rotated a predetermined amount.

8. An apparatus of the character described comprising means for moving a sensitized sheet, a developer applying member arranged to contact with the sensitized surface of the sheet and movable to and from said means, and means for delaying the movement of said member toward the first named means.

9. An apparatus of the character described comprising an endless band mounted for circuitous movement and adapted to move a sensitized sheet, a developer applying member arranged to contact with the sensitized surface of a sheet moving with said band and mounted for movement to and from said band, and means for delaying the movement of said member toward said band.

10. An apparatus of the character described comprising means for moving a sensitized sheet, a movable developer member arranged to contact with the sensitized surface of a sheet moving with said means, and means for delaying the movement of said member toward the firstnamed means controlled by the movement of the firstnamed means.

11. An apparatus of the character described comprising means for moving a sensitized sheet, a developer member mounted for movement to and from a position to contact with said sensitized sheet, and means for delaying the movement of said member toward the firstnamed means including a pawl movable with said member and a gear wheel operable with the firstnamed means and arranged for the engagement of said pawl to hold said member away from the firstnamed means until said gear wheel is rotated a predetermined amount.

12. An apparatus of the character described comprising means for moving a sensitized sheet, developer applying means cooperable with the firstnamed means, a fixed member at the delivery portion of the firstnamed means and arranged for the movement of the sheet across said member, and an endless band mounted for circuitous movement and moving along said member for washing the sensitized surface of said sheet.

In testimony whereof I have signed my name to this specification.

BENJAMIN JAMES HALL.